United States Patent [19]

Burnett

[11] 4,036,101
[45] July 19, 1977

[54] DOUBLE HOLLOW BRAIDED ROPE ASSEMBLY AND METHOD

[75] Inventor: Ralph G. Burnett, Kenosha, Wis.

[73] Assignee: The Burnett Company, Ltd., Kenosha, Wis.

[21] Appl. No.: 636,412

[22] Filed: Dec. 1, 1975

[51] Int. Cl.² .................... B66C 1/12; D04C 1/12; F16G 11/00
[52] U.S. Cl. .................................. 87/8; 57/142; 57/159; 294/74
[58] Field of Search .................. 87/6, 7, 8; 57/142, 57/159, 22, 23; 294/71, 74–78 R; 24/115 R, 115 H, 115 K, 122.3, 122.6

[56] References Cited

U.S. PATENT DOCUMENTS

| | | | |
|---|---|---|---|
| 1,243,337 | 10/1917 | O'Connell | 87/9 UX |
| 1,967,102 | 7/1934 | Schlegel | 87/9 |
| 2,463,199 | 3/1949 | Peterson | 57/142 |
| 2,702,983 | 3/1955 | Mische | 57/142 |
| 2,943,434 | 7/1960 | Joy et al. | 57/142 |
| 3,204,519 | 9/1965 | Lawson et al. | 87/8 |
| 3,411,400 | 11/1968 | Morieras et al. | 87/8 |
| 3,537,742 | 11/1970 | Black | 294/74 |
| 3,583,749 | 6/1971 | Hopkins | 294/74 |
| 3,672,006 | 6/1972 | Fidrych | 87/8 X |
| 3,854,767 | 12/1974 | Burnett | 294/74 |

Primary Examiner—John Petrakes
Attorney, Agent, or Firm—Seymour Rothstein

[57] ABSTRACT

A double braided hollow rope assembly and method for making same wherein the rope consists of an inner hollow braided rope core and an outer braided rope jacket. The braid on the side of the outer jacket is opened and through that opening, a loop of the inner rope is pulled. A retaining ring with barbs formed thereon to engage the braids of the outer jacket is placed on the end of the rope to be spliced or formed into a loop or eye. The braid on the side of the inner core which has been pulled through the opening in the outer jacket is opened. The end of the rope with a retaining ring around it is inserted into the opening in the side of the hollow core of the inner rope. The outer jacket is then worked backwards until it once more covers the inner loop with the end of the rope with the retaining ring now contained within the hollow longitudinal central opening of the inner core. As an alternative, the end of the outer jacket may be retracted to thereby expose a few inches of the inner core which is then cut off and discarded. The outer jacket is then replaced in its normal position and the barbed retaining ring is applied to the jacket near its end where the core is now absent, whereupon the splicing and replacement of the jacket over the loop of the core is accomplished.

12 Claims, 12 Drawing Figures

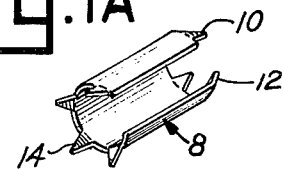
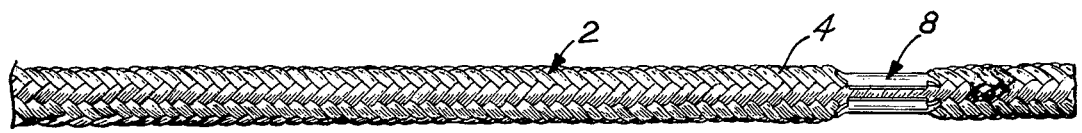
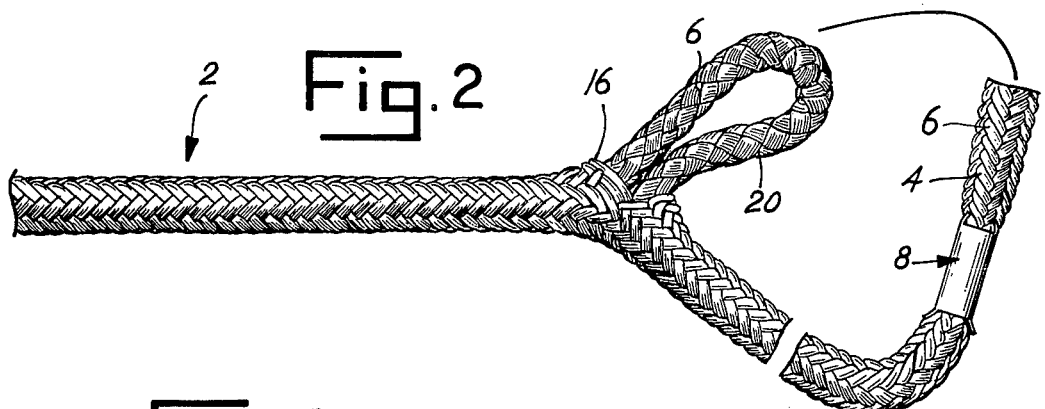
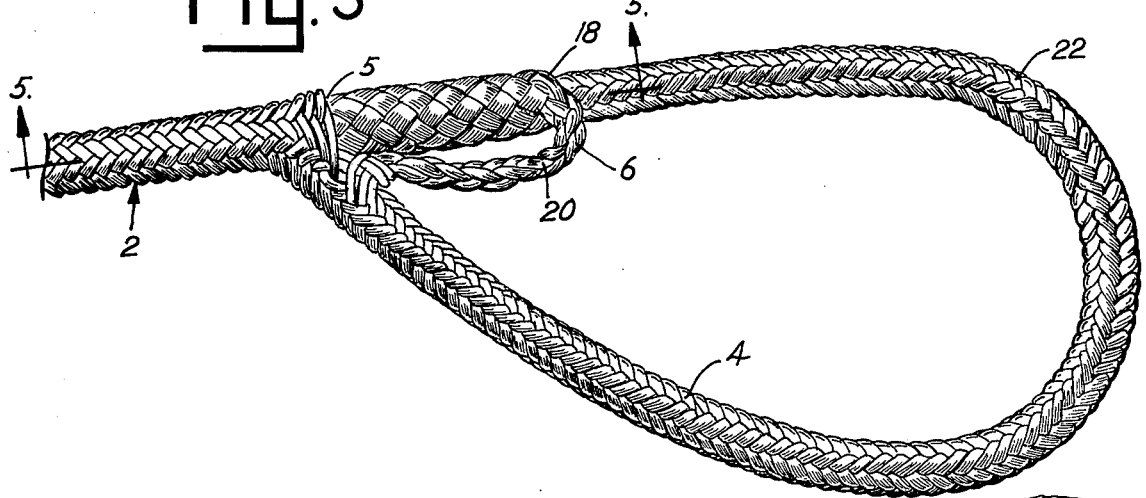
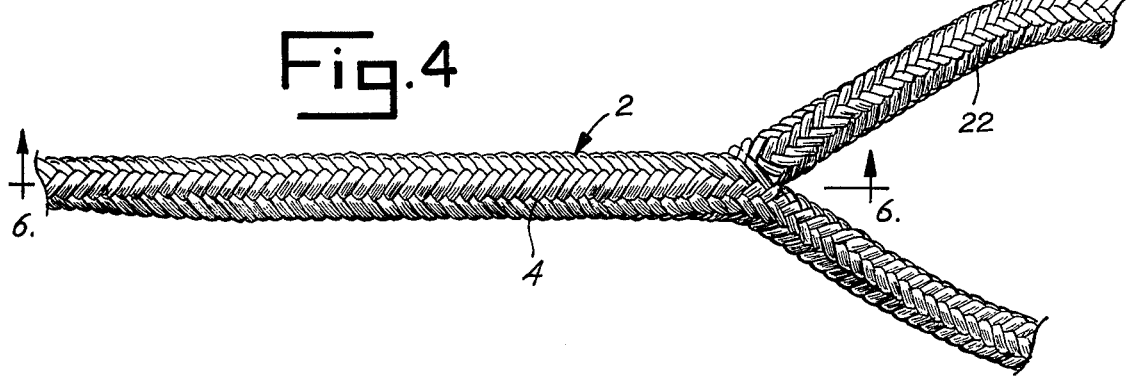

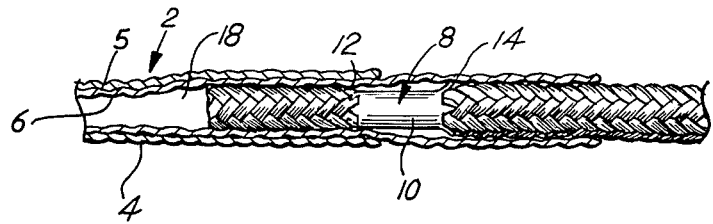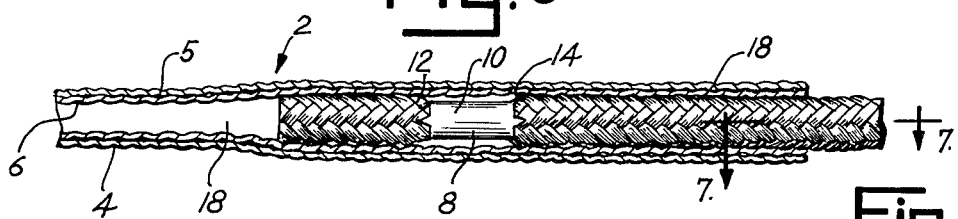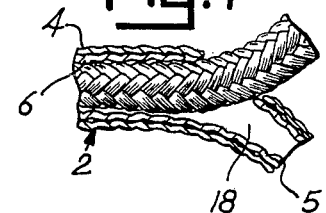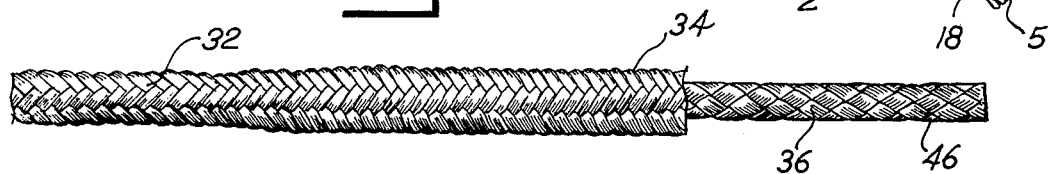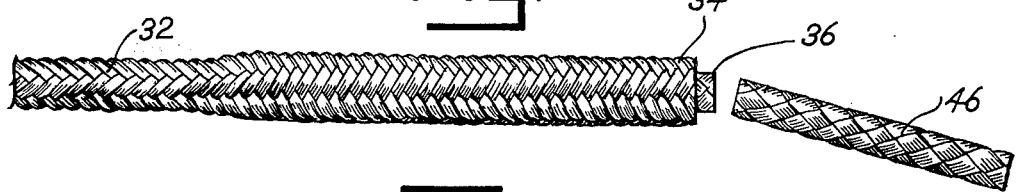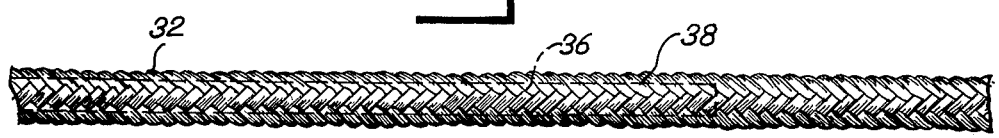

DOUBLE HOLLOW BRAIDED ROPE ASSEMBLY AND METHOD

BACKGROUND OF THE INVENTION

The present invention relates to an improved rope assembly and method of making same, and more particularly, relates to double hollow braided rope in which it is desired to provide a loop or a splice.

The art has recognized that a loop rope assembly may be formed from a flexible braided rope by inserting the terminus of one end of the rope down the hollow rope along the longitudinal axis thereof whereby the rope end is retained in the center of the rope against pullout by the rope strands or braids of the hollow rope when a tension force is applied to the rope. One known prior art rope assembly, shown for example, in U.S. Pat. No. 3,583,749, works on the principle of a Chinese finger braid wherein the braid tightly grips fingers inserted into the ends of the braid as the fingers are pulled apart. The greater the tension applied to the loop, the stronger the gripping force asserted by the hollow strands on the end of the rope inserted therein, thus minimizing pullout under tension loads. In this structure, the end of the rope within the hollow braided rope may be moved or removed by relaxing the tension force on the hollow rope and urging the strands together, thereby releasing their grip on the rope end.

Hollow braided rope and hollow double braided rope are generally manufactured from a plastic material. Hollow braided rope is made from groups of fibers or strands and are commonly 8 strand, 12 strand and 16 strand. A material such as polypropylene is disclosed in U.S. Pat. No. 3,583,749 and U.S. Pat. No. 3,854,767. Materials such as polypropylene, polyethylene and nylon are inherently slippery due to their low coefficient of friction. This leads to a tendency for the end of the rope to slip relative to the center with the result that the connection becomes detached. This slippage is particularly apparent when the rope is not maintained under a high tension load. In U.S. Pat. No. 3,854,767, a barbed retaining ring is positioned on the rope and is adapted to be inserted into the center of a single hollow braided rope to prevent pullout of the rope, even under low tension.

The aforementioned patents relate to single hollow braided rope whereas the present invention relates to double hollow braided rope and its assembly to form a loop or splice.

SUMMARY OF THE INVENTION

Accordingly, it is an object of the present invention to provide a means and method for readily interconnecting a rope end positioned within the center of the inner core of a double hollow braided rope so that it will reliably interconnect the rope end and the hollow rope under low tension and sill permit adjustment of the rope when tension is released.

Another object of this invention is to provide an improved rope assembly including a retaining ring to be positioned on the rope end which is inserted within the center of the inner core of a double braided rope to prevent pullout of the rope end.

Yet another object of this invention is to provide a connection for double hollow braided rope wherein the holding action of the rope assembly is threefold; namely, by the barbed retaining ring, the Chinese finger effect of the inner core and the Chinese finger effect of the outer jacket.

Double hollow braided rope is used extensively on pleasure boats including both sail and power craft. It is stronger than single braided rope and is desirable to form loops or splices which will not readily pull apart and also to provide loops which are adjustable as to size. In addition to strength being an important factor in boating as well as for other applications, it is the desire of most boaters to enhance the appearance of their boats and accessories and also to be able to adjust the size of loops or eyes in the lines and sheets. Therefore, it is an object of the invention to provide a very strong adjustable splice in double hollow braided rope which provides a very smooth appearance and which is advantageous not only from a cosmetic standpoint, but is also less likely to cause damage or injury to the hands of the persons handling such ropes.

According to the present invention, there is provided a rope assembly which comprises a rope end inserted into the center of the core of a flexible hollow double braided rope along the longitudinal axis thereof. The rope end is partially retained in the center of the inner core against pullout by the rope braids of the hollow core gripping the rope end when tension is applied to the rope. The rope end is also partially retained in the center of the hollow rope against pullout by the rope braids of the outer jacket gripping the rope braids of the inner core. The rope end inserted into the center of the hollow inner core can comprise a single rope section wherein one end of the rope is inserted to form a circle. Similarly, the hollow rope and the rope end can be two separate pieces of rope. In one embodiment of the invention, the rope assembly is a single piece of rope, wherein the rope end is inserted between the rope braids that form the inner core of the rope into the center thereof to form a loop at one end of the rope. A retaining ring is rigidly affixed adjacent to or at the end of the rope to assist in preventing pullout of the rope end and the retaining ring is provided with barbs or projections which are adapted to engage the hollow inner core of the double braided rope.

Other objects and advantages of this invention will become apparent in the following detailed description.

BRIEF DESCRIPTION OF THE DRAWINGS

Two presently preferred embodiments of the present invention are illustrated in the attached drawings, wherein like numerals refer to like elements and wherein:

FIG. 1 is an elevation view of the double hollow braided rope used in the present invention with a retaining ring attached adjacent the end thereof;

FIG. 1A is a perspective view of the retaining ring;

FIG. 2 is a detail view showing the inner braided core of the rope pulled out of the outer jacket at an intermediate position to form an exposed loop of the inner core;

FIG. 3 is a detail view of the next step in making the loop wherein the rope end is inserted into an opening formed in the inner core loop and extends into the hollow inner core;

FIG. 4 is a detail partial view of the completed connection;

FIG. 5 is a detail cross sectional view of the assembly taken generally on lines 5—5 of FIG. 3;

FIG. 6 is a sectional view of the completed connection taken generally on line 6—6 of FIG. 4;

FIG. 7 is a partial sectional view taken on line 7—7 of FIG. 6;

FIG. 8 is a view of a double hollow braided rope with the end of the inner core pulled out of the outer jacket and is the first step in practicing a second embodiment of the invention;

FIG. 9 is a view similar to FIG. 8 showing the exposed end of the inner core cut off adjacent the end of the outer jacket;

FIG. 10 is a view showing the position of the inner core and outer jacket after the end of the inner core has been removed and the outer jacket replaced in its normal position; and FIG. 11 is a view of the rope just prior to inserting the rope end with the barbed retaining ring into the hollow unobstructed end portion of the inner core to form a connection.

DESCRIPTION OF THE PREFERRED EMBODIMENT

Referring to FIGS. 1 through 7 for description of one embodiment of the invention, there is illustrated a conventional polypropylene double hollow braided rope which includes an outer hollow braided jacket 4 and an inner hollow braided core 6. Secured to the rope adjacent one end thereof is retaining ring 8 which surrounds the outer jacket 4. The retaining ring 8 is preferably manufactured from a material such as stainless steel and also serves to provide rigidity to the end of the rope 2, thereby facilitating the insertion of the rope end into the inner core in a manner to be described.

Referring to FIGS. 1, 1A and 2, the retaining ring 8 is formed from a metal sheet 10 to form a generally circular or annular ring which fits over and is retained on one end of the rope 2. Ring 8 is rigidly retained in position on the rope 2 by inwardly bent barbs 12 that engage and grip the fiber braids of the outer jacket 4. Outwardly turned barbs 14 engage the inner core 6 as best shown in FIGS. 5 and 6 when the assembly is completed.

With reference to FIGS. 2 through 7, after the metal retaining ring 8 is attached to the end of rope 2, an opening is made in the braids of the outer jacket 4 as shown at 16 and a loop 20 of the inner core 6 is withdrawn from the outer jacket 4. The outer jacket 4 provides an axial opening 5 for the inner core 6. Thereafter, as shown by the arrow in FIG. 2 and as shown in FIGS. 3 and 4, the end of the rope 2 with the retaining ring 8 thereon is inserted into an axial opening 18 in the inner core 6 as shown in FIGS. 5, 6 and 7. The loop 20 is withdrawn from the outer jacket 4 at a desired position depending on the size of a main loop or eye 22 required. After the end of the rope 2 is inserted into the opening 18 of the inner core 6, the braids are worked back into position so that a smooth splice or eye is provided as shown in FIG. 4, the loop 20 being withdrawn into the axial opening 5 in the outer jacket 4. The resultant configuration is shown in FIGS. 4 and 7.

As shown in FIGS. 5 and 6, the end of the rope 2 enters the opening 18 of the inner core 6 with the barbs 12 engaging the outer braids of the outer jacket 4 as previously described and with the outwardly extending barbs 14 engaging the inner surface of the braids of the core 6. The result is a triple gripping action to prevent the end of the rope 2 from pulling out of position which is intensified when tension is applied on the eye 22. Not only do the barbs 14 help prevent pullout, but there is a double Chinese finger effect of the braids of the inner core 6 and the braids of the outer jacket 4. The result is a much stronger connection than the tensile strength of the rope itself which means that the rope would break before the end of the rope 2 would pull out to destroy the eye 22.

If the user of the rope assembly should subsequently enlarge or decrease the size of the eye 22, the end of the rope 2 may be moved by axially compressing the outer jacket 4 and the inner core 6, thereby releasing tension on the braids and enlarging the center sections 5 and 18. The end of the rope 2 with the retaining ring 8 thereon can then be moved a small distance thereby freeing the barbs 14 from the braids of the inner core 6 and the end may be pulled out to enlarge or pushed in to decrease the diameter of the eye 22. If desired, a complete new assembly may be made following the steps shown in FIGS. 2, 3 and 4.

Referring now to FIGS. 8, 9, 10 and 11 for description of a second embodiment of the invention, a rope 32 of the same double hollow braided type is shown. Rope 32 includes an outer braided jacket 34 and an inner braided core 36. An axial opening 38 is provided in the outer jacket 34. The inner core 36 is also provided with a central axial opening (not shown). As shown in FIG. 11, a retaining ring 40 having inwardly projecting barbs 42 and outwardly projecting barbs 44 thereon is secured to the end of the rope 32, which retaining ring is similar in construction to that shown in FIG. 1A. However, prior to placing the retaining ring 40 on the rope 32, a length 46 of the inner core of the rope is withdrawn from the jacket 32 as shown in FIG. 9 and the end is cut off from the inner core 36. Thereafter, as shown in FIG. 10, the braids of the outer jacket 32 are placed in their normal position which leaves the end of the rope which is used to form the eye or loop 22 of FIG. 4 without the inner core 36 therein. This results in making the end of the rope which is to be inserted to form the loop 22 much less bulky and makes it easier to replace the jacket over the loop in the last step of making the loop shown in FIG. 4.

A given length of double braided hollow rope may thus be provided with a loop of any desired size. Once established, the size of the loop will be maintained. One desirable use of the present invention is for lines or sheets for boats and it may also be used for other purposes such as for dog or other animal leashes.

Although a polymer such as polypropylene is preferred, the rope can be made from polyethylene or similar material.

While two presently preferred embodiments of the invention have been disclosed, modifications may be made without departing from the fundamentals of the invention. Accordingly, it is intended that this patent will cover all patentable features as embodied within these claims.

I claim:

1. A rope assembly which comprises a flexible double braided hollow rope including an outer braided jacket having a central axial opening therein and an inner braided core having a central axial opening therein and a rope end inserted into the center of the hollow inner core along the longitudinal axis of the hollow rope to form a loop, the rope end being retained in the opening of the core against pullout by the rope braids of the hollow core gripping the rope end portion and the rope braids of the outer braided jacket gripping the core surrounding the rope end portion when tension is applied thereto.

2. A rope assembly as in claim 1 wherein the rope end portion and hollow rope are a single length of rope.

3. A rope assembly as in claim 2 wherein the rope end is inserted between the rope braids of the outer jacket and into the opening of the inner core at an intermediate point along the rope to form a loop at one end of the rope.

4. A rope assembly as in claim 1 wherein the rope is polypropylene.

5. A rope assembly as in claim 1 including a retaining ring rigidly affixed to a portion of the rope which is to be insertd into the hollow inner core.

6. A rope assembly as in claim 5 wherein said retaining ring comprises retaining means for rigidly engaging the ring and rope end portions and barbs for internally enagaging the braids of the core to prevent pullout.

7. A rope assembly as in claim 5 wherein said retaining ring is adapted to permit further insertion of the rope end portion into the inner core.

8. A rope assembly as in claim 1 wherein an end portion of the inner core is removed adjacent the end of the rope end and a retaining ring is secured to the portion of the rope end which is devoid of the inner core.

9. The rope assembly as in claim 8 wherein the rope end portion and the hollow rope are a single length of rope.

10. The rope assembly as in claim 8 wherein said retaining ring comprises a metal strip formed to provide a ring and barb means formed on the edges of the ring.

11. The method of splicing a rope assembly of the flexible double braided hollow type which includes an outer braided jacket having a central axial opening therein and an inner braided core having a central axial opening, which comprises the steps of (1) making an opening in the braids of the outer jacket, (2) forming a loop by withdrawing a portion of the inner core through the opening, (3) inserting the end of the rope into the braids of the inner core and into the central axial opening therein, (4) manipulating the braids of the outer jacket to cover the loop of the inner core with the end of the rope therein to substantially recover the loop of the inner core, and (5) tensioning the loop so that the braids of the inner core grip the end of the rope and the braids of the outer braided jacket grip the inner core about the rope end.

12. The method as claimed in claim 11 including (6) the step of placing a barbed retaining member on the end of the rope which is inserted into the axial opening of the inner core prior to recovering the said loop with the braids of the outer jacket.

* * * * *